(12) United States Patent
Latiri (10) Patent No.: US 6,308,761 B1
(45) Date of Patent: Oct. 30, 2001

(54) HAND TOOL AIDING MOUNTING OF GRIP ON GOLF CLUB SHAFT

(75) Inventor: Mondher Latiri, Kaohsiung (TW)

(73) Assignee: Technorama Co., Ltd., Kaohsiung (TW)

( * ) Notice: Subject to any disclaimer, the term of this patent is extended or adjusted under 35 U.S.C. 154(b) by 0 days.

(21) Appl. No.: 09/448,520

(22) Filed: Nov. 24, 1999

(51) Int. Cl.$^7$ ................................................ B32B 31/00
(52) U.S. Cl. ................................. 156/579; 156/391
(58) Field of Search ................................. 156/391, 392, 156/475, 486, 488, 574, 579

(56) References Cited

U.S. PATENT DOCUMENTS

| | | | |
|---|---|---|---|
| 2,044,456 | 6/1936 | Yeager | 156/201 |
| 3,223,571 | 12/1965 | Straughan | 156/392 |
| 5,273,611 | 12/1993 | Webb et al. | 156/392 |
| 5,281,288 | 1/1994 | Murray et al. | 156/83 |
| 5,288,359 * | 2/1994 | Stobbie, IV et al. | 156/294 |
| 5,419,797 * | 5/1995 | Ciamaga et al. | 156/314 |
| 5,573,627 | 11/1996 | Vuong | 156/392 |
| 5,865,945 | 2/1999 | McConaughy | 156/579 |
| 6,245,178 * | 6/2001 | Lenhof et al. | 156/187 |

\* cited by examiner

*Primary Examiner*—James Sells
(74) *Attorney, Agent, or Firm*—Leydig, Voit & Mayer, Ltd.

(57) ABSTRACT

A hand tool according to the invention includes a handle; a frame extending from the handle, the frame including a central opening and two edges extending from the central opening to a peripheral edge of the frame, defining a peripheral opening in the frame; and a clamp with a central opening, fastenable to the frame for clamping a flexible member having a central opening between the frame and the clamp with the central openings of the frame, the flexible member, and the clamp generally aligned. The flexible member has a slit or peripheral opening extending from the central opening to the periphery of the flexible member. The flexible member is firmly held in the tool between the frame and the clamp. The tool can be drawn along a shaft that is positioned within the central opening, with the flexible member being deflected by direct contact with the shaft at the central opening, to spread an adhesive or other material on the shaft or wrap an adhesive tape onto the shaft. The tool is particularly useful in installing grips on golf club shafts.

24 Claims, 6 Drawing Sheets

HAND TOOL AIDING MOUNTING OF GRIP ON GOLF CLUB SHAFT

FIELD OF THE INVENTION

The present invention relates to a hand tool that is particularly useful for wrapping golf club grip tape around a golf club shaft prier to the installation of a grip on the golf club shaft. This invention also pertains to a hand held applicator used for uniformly spreading bonding agents, such as glues and resins, over a portion of a golf club shaft for installing a grip on the shaft.

BACKGROUND OF THE INVENTION

A golf club includes a head, a shaft, and a grip. The golf club head is used to hit a golf ball. The shaft is an elongated and tapered cylindrical section inserted at its narrow end into the golf club head in some permanent manner to transmit the force of the golfer's swing to the head. A grip made of rubber or some other suitable material is slipped over the golf club shaft at its wider end and bonded in some permanent manner to the shaft. The purpose of the golf club grip is to afford the golfer a non-slippery, cushioned, firm, and secure hold over a portion of the shaft.

Since the purpose of the golf club grip is to enable a golfer to have much better control of the golf club, the grip must be properly secured onto the shaft so that the grip does not rotate under the golfer's hand or slip off the shaft during a golf swing while still providing the golfer with a cushioned and comfortable hold on the golf club.

In a first conventional method of installing a grip on a shaft, bonding agents, such as glues or resins, in a liquid or semi-liquid form, are used. The golf club shaft is held firmly in a vise or other device and a liquid or semi-liquid bonding agent, such as a glue or resin, is poured over a portion of the golf club shaft and spread uniformly with a brush or rag. The shaft is then inserted into the grip. Excess bonding agent accumulated at the opening of the grip during insertion of the shaft into the grip is removed. The grip is then stretched and positioned properly on the shaft and the bonding agent is allowed to cure. A comparable method includes dipping the butt end of the shaft into the bonding agent, wiping off excess bonding agent, installing the grip, and permitting the bonding agent to cure. Both of these methods are the least popular techniques for installing a grip because they are messy, time consuming, and not economical. Further, a person installing the grip must wear protective clothing in order to avoid touching the bonding agent which may cause an allergic reaction or irritation and is difficult to remove without the use of solvents, thinning agents, and similar toxic substances.

In another known method of installing a grip, double-sided tape is used as the bonding agent between the shaft and the grip. Double-sided grip tape is a narrow strip of paper, both sides of which have been coated or impregnated with a bonding agent, such as a glue or resin. In order to make the tape convenient and economical to use, a waxed paper is placed on one of the sticky surfaces of the paper to prevent the tape from sticking to itself when rolled. Double-sided grip tape is available in several widths, the most popular being three-quarters inch wide and two inches wide. The three-quarter inch wide tape is particularly suited for a spiral wrap method of installing a grip while the two inch wide tape is more suitable for the vertical wrap method. Both methods are now described.

In the spiral wrap method, a shaft is held in a vise and a sticky side of a relatively narrow roll of grip tape is wound in a spiral pattern around the shaft. The waxed paper is then removed from the tape and a solvent is poured into the opening of the grip and onto the grip tape. The application of the solvent makes the surfaces inside the grip and on the tape both sticky and slippery. The shaft is then inserted into the grip and the grip is cleaned and stretched, and the assembly is set aside for the curing of the solvent and adhesive. Although this spiral wrap method is not as messy as the techniques described above, it is time consuming, increasing costs.

In the vertical wrap method, the most popular method because of its simplicity and speed, the shaft placed in a vise or other holding implement. A strip of relatively wide double-sided tape is cut to length, and the tape is placed on the shaft, length-wise. The tape is wrapped around the shaft and smoothed over its length either before or after the waxed paper coating is removed. Solvent is poured into the opening in the grip and onto the shaft where the tape is present. Then, the shaft is inserted into the grip, excess solvent is removed, the grip is stretched and placed as desired, and the assembly is left for curing of the adhesive and solvent. The most difficult step in this vertical wrap method is the overlapping and smoothing of the tape on the shaft so that the overlapped part of the tape does not leave a ridge that might be tactilely perceptible by a golfer using the golf club. The overlapping operation is usually not difficult for an experienced person. However, that person usually uses his bare hands in order to achieve the appropriate overlapping and smoothing of the tape. This step can be messy and require the person assembling the golf club to clean bonding agent residue from his hands and the equipment once the grip installation is complete. The use of solvents and other cleaning materials may be dangerous and is undesirable.

SUMMARY OF THE INVENTION

Accordingly, an objective of the invention is to eliminate the problems associated with assembling golf club grips using bonding agents in a liquid or semi-liquid form or using a double-sided grip tape.

A hand tool according to the invention includes a handle; a frame extending from the handle, the frame including a central opening and two edges extending from the central opening to a peripheral edge of the frame, defining a peripheral opening in the frame; and a clamp with a central opening, fastenable to the frame for clamping a flexible member having a central opening between the frame and the clamp with the central openings of the frame, the flexible member, and the clamp generally aligned.

A hand tool according to the invention includes a handle; a frame extending from the handle, the frame including a central opening and two edges extending from the central opening to a peripheral edge of the frame, defining a peripheral opening in the frame; a flexible member comprising a generally planar member with a central opening and a discontinuous portion extending from the central opening to a periphery of the flexible member; and a clamp with a central opening, fastened to the frame for clamping the flexible member having a central opening between the frame and the clamp with the central openings of the frame, the flexible member, and the clamp generally aligned.

A flexible member for clamping in the tool has a slit or peripheral opening extending from the central opening to the periphery of the flexible member. The tool can be drawn along a shaft that is positioned within the central opening of the flexible member, with the internal edge of the central opening of the flexible member being deflected by direct contact with the shaft, to spread an adhesive or other material on the shaft or to wrap an adhesive tape onto the shaft. The tool is particularly useful in installing grips on golf club shafts but has many other uses according.

BRIEF DESCRIPTION OF THE DRAWINGS

FIGS. 6A–6H are views illustrating a method of using a tool according to the invention.

DETAILED DESCRIPTION OF PREFERRED EMBODIMENTS

Figure 1A:
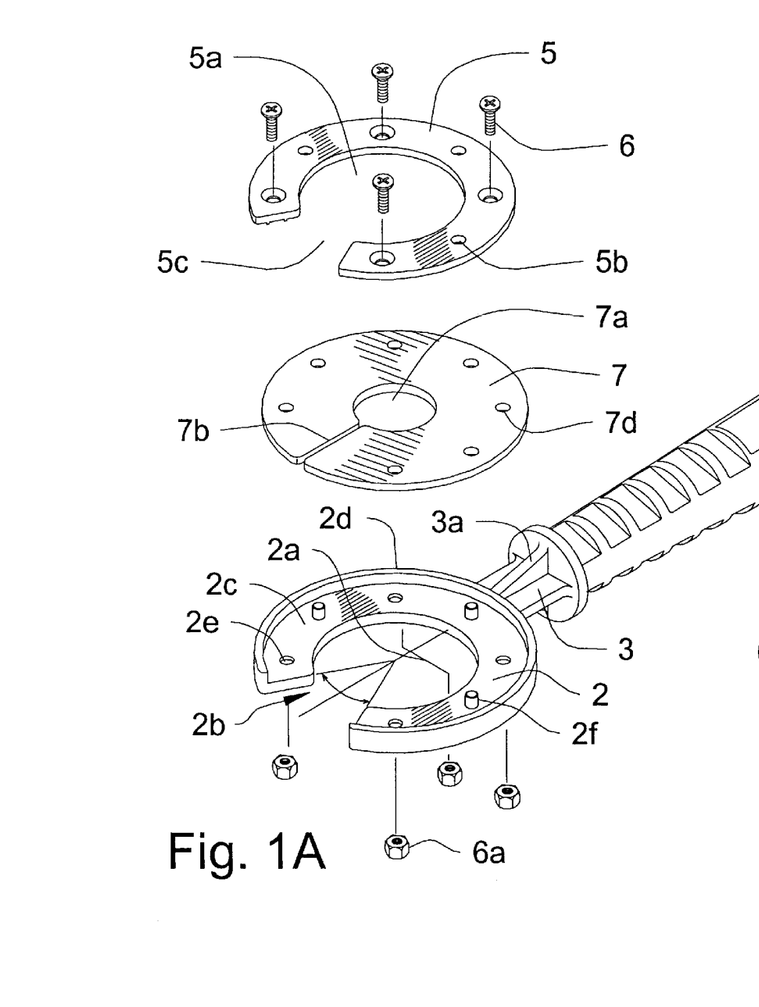
FIG. 1A is an exploded view of a tool according to the invention from a top side and FIG. 1B is a view of the tool from a bottom side.
Figure 1B:
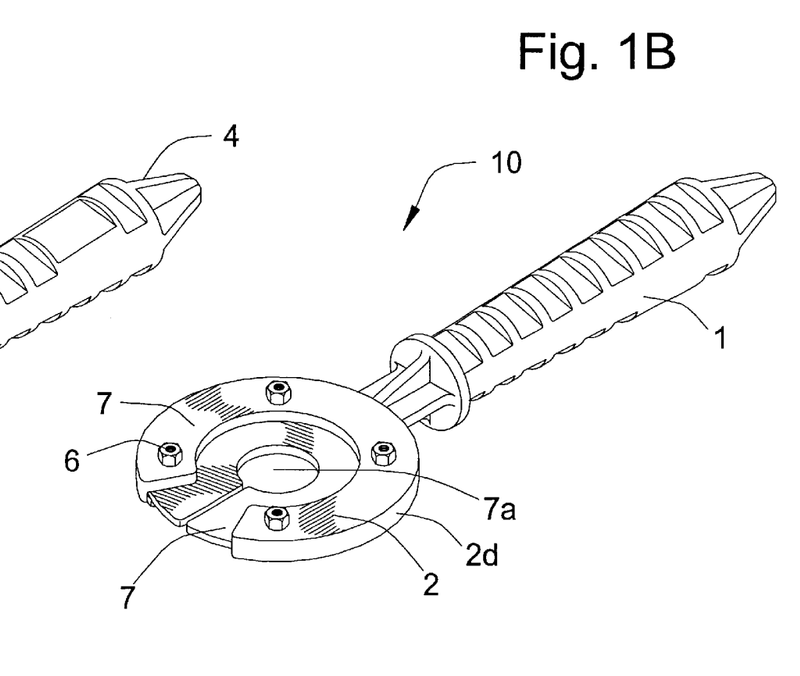

An embodiment of the invention is illustrated in an exploded view and an assembled view in FIGS. 1A and 1B, respectively. A tool 10 includes a handle 1 including a gripping portion to be held in the hand. A frame 2 extends from one end of the handle and is attached to the handle by a planar extension 3 of the handle. Ribs 3A, transverse to the planar part 3, reinforce the connection between the handle and the frame. The frame extends generally parallel to and is coplanar with a central axis of the handle 1.

In the illustrated embodiment, the frame 2 is generally annular and includes a central, generally circular opening 2A. The frame is not continuous but includes a peripheral opening 2B opposite the handle that is defined by two radii extending from the center of the opening 2A. The peripheral opening 2B joining the central opening 2A is referred to as a radial opening 2B if the annular frame 2 has edges along each of two radii of the frame that define the radial opening.

In the illustrated embodiment, the frame 2 includes a generally planar member 2C and a peripheral flange 2D generally transverse to the planar member 2C. The planar member 2C includes a plurality of holes 2E that are used, as explained below, in fastening together parts of the tool. Posts or tubes 2F project from the planar member 2C in the same direction as the peripheral flange 2D and are used in registration of a flexible member and a clamp, as described below.

At the opposite end of the handle 1 from the frame 2, the handle includes a tapered end 4 with a tip that is smaller than the end of the handle. The tapered end is shown as including four mutually perpendicular tapering ribs. The same function could be achieved by a conical end on the handle. Preferably, the handle 1, planar portion 3, frame 2, and end 4 are a unitary element, for example, a molded plastic unit.

The tool includes a clamp 5 having a substantially annular shape with a central opening 5A. The illustrated embodiment of the clamp is a planar member with a generally annular shape that includes a radial opening 5C. That radial opening is similar or identical in dimensions to at least part of the radial opening 2B of the frame 2 of the tool. The clamp 5 also includes a plurality of holes 5B of two different types. One group of holes is dimensioned and arranged to pass respective posts 2F for registration of the clamp with respect to the frame 2. The second group of holes 5B align with respective holes 2E of the frame 2. In the illustrated embodiment, those holes of the second group are countersunk for receiving the tapered heads of fasteners, such as the flat head screw 6 shown in FIG. 1.

As bent seen in FIG. 1, the tool, when assembled, includes a flexible member 7. In the illustrated embodiment, that flexible member 7 is generally annular and includes a central opening 7A. Further, in this embodiment, a slit 7B extends from the central opening 7A to the outside peripheral edge of the flexible member 7. The flexible member 7 also includes a plurality of holes 7D that are arranged for alignment with corresponding holes2E or posts 2F of the frame 2.

Each of the clamp 5 and the flexible member 7 are assembled to the frame 2 of the tool 10, as illustrated in FIG. 1B. In the illustrated embodiment, the posts 2F pass through corresponding holes 7D in the flexible member 7 and through other corresponding holes 5B in the clamp 5. Then, fasteners, such as the screws 6, are inserted through the other group of holes within the clamp, pass through corresponding holes 7D in the flexible member 7 and through holes 2E in the frame 2. The screws are fastened with nuts 6A, firmly clamping the flexible member 7 between the Clamp S and the frame 2. Alternatively, the holes 2E may be threaded to engage the screws 6 without the necessity of employing nuts 6A. However, if, as preferred, the frame 2 is molded of plastic, the use of the nuts 6A or other engaging members to engage the screws 6 may be desirable. Otherwise, problems such as stripping of threads in the plastic material within the holes 2E may occur. The screws 6 and the nuts 6A are only illustrative, and other kinds of fasteners might be used, such as cotter pins, screws engaging tinnerman nuts, and other fasteners that can firmly hold together the clamp 5 and the frame 2 with the flexible member 7 between them.

As illustrated in FIG. 1A, in a preferred embodiment, the peripheral flange 2D receives within it peripheral edges of both the flexible member 7 and the clamp 5. Thus, in the assembled tool, in a preferred embodiment, the clamp 5 may be planar with the extending outer surface of the flange 2D. As described below, the clamp and frame provide peripheral support for flexing of the central portion of the flexible member 7 when used to spread adhesive or to overlap and apply a bonding tape having an adhesive on both sides.

Figures 2A, 2B:
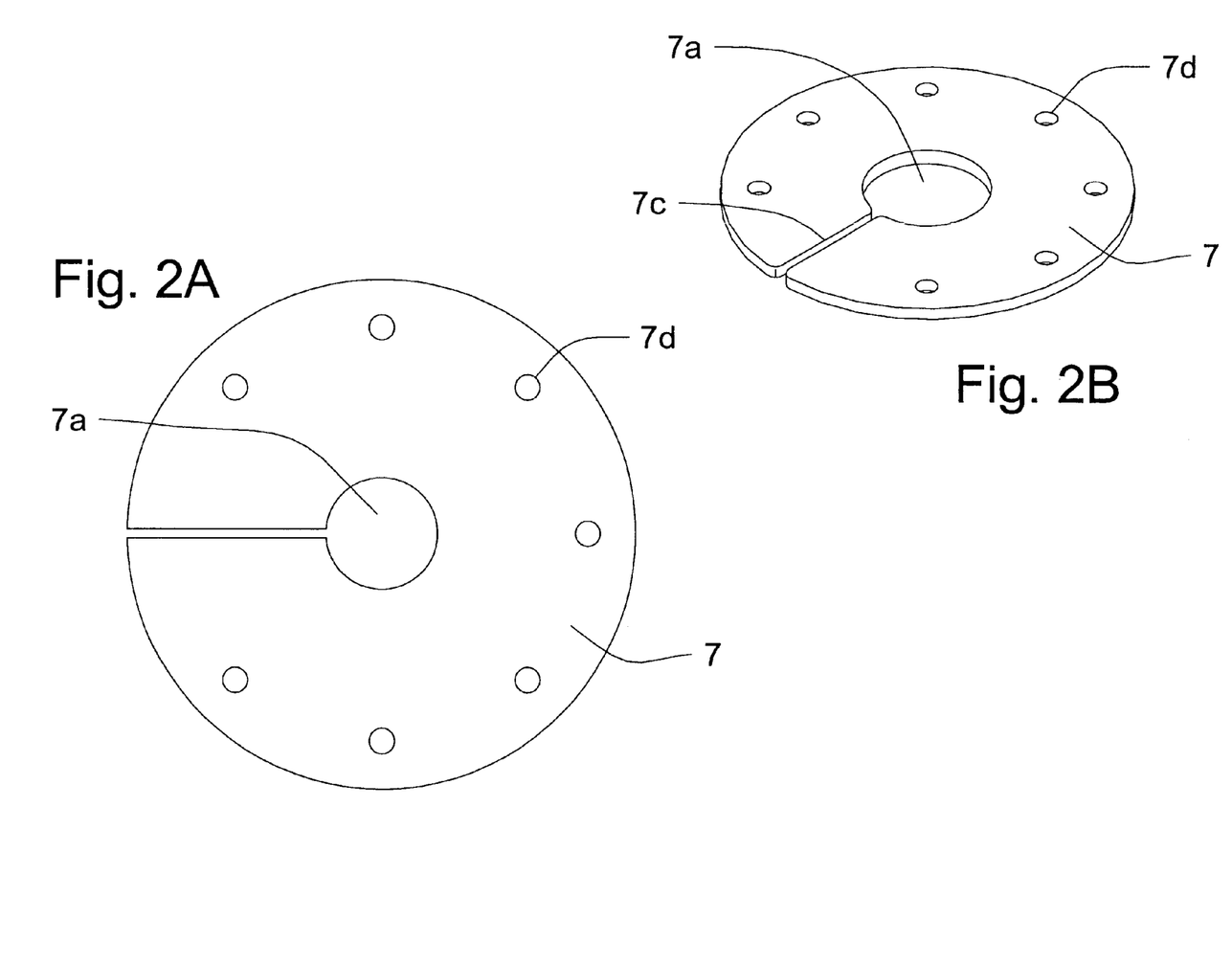
FIGS. 2A and 2B are plan and perspective views of a flexible member employed in the tool according to the invention.
Figures 3A, 3B:
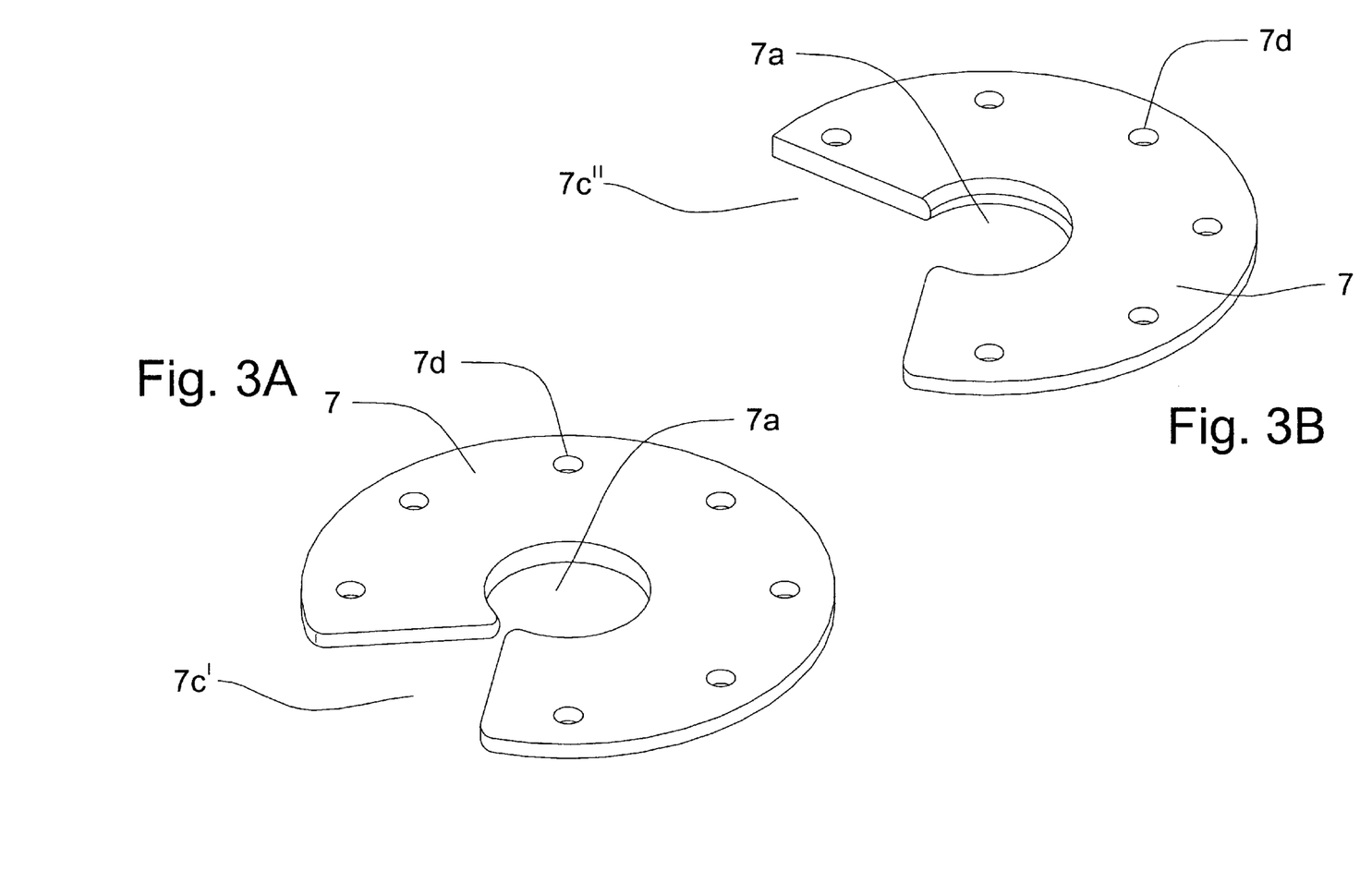
FIGS. 3A and 3B are perspective views of alternative embodiments of flexible members for use in a tool according to the invention.

FIGS. 2A and 2B illustrate in plan and perspective views, respectively, further examples of the flexible member 7 that is illustrated in FIG. 1A and that includes a narrow radial slit 7D extending from the central hole 7A to a peripheral edge of the flexible member. Flexible members employed in the tool are not limited to the embodiments illustrated in FIGS. 2A and 2B. Further embodiments are illustrated in perspective views in FIGS. 3A and 3B. The flexible member shown in FIG. 3A includes, in place of the slit 7B of the other embodiments, a peripheral opening 7C', effectively a missing segment of the annular flexible member. This opening 7C' has edges that are not necessarily defined by radii of the flexible member and, thus, is not referred to as a radial opening. Of course, the opening could be a radial opening if desired. Still a wider peripheral opening 7C" is shown in the embodiment of FIG. 3B. Peripheral opening 7C" is not shown as a radial opening but could be a radial opening if desired, particularly one directly supported by the frame 2 at its radial opening 2B. The slot 7B and the peripheral openings 7C' and 7C" are collectively discontinuities in the flexible member that assist is its pressure applying function as described below.

As particularly illustrated in FIG. 3B, it is desirable that the central opening 7A of the flexible member have a radiused edge. In other words, in cross-section, the wall of the opening is arcuate, rather than being planar and perpendicular to the principal surface of the flexible member 7. This radiused edge can be of assistance in applying a liquid or semi-liquid adhesive or smoothing an overlapping bonding tape, as described below. Another edge shape, i.e., not a portion of a circle in cross-section but having, for example, a triangular cross-section, can be used. Any edge shape that aids in spreading an adhesive or smoothing a tape may be present at the inside surface of the central opening 7A.

Figures 4A, 4B:
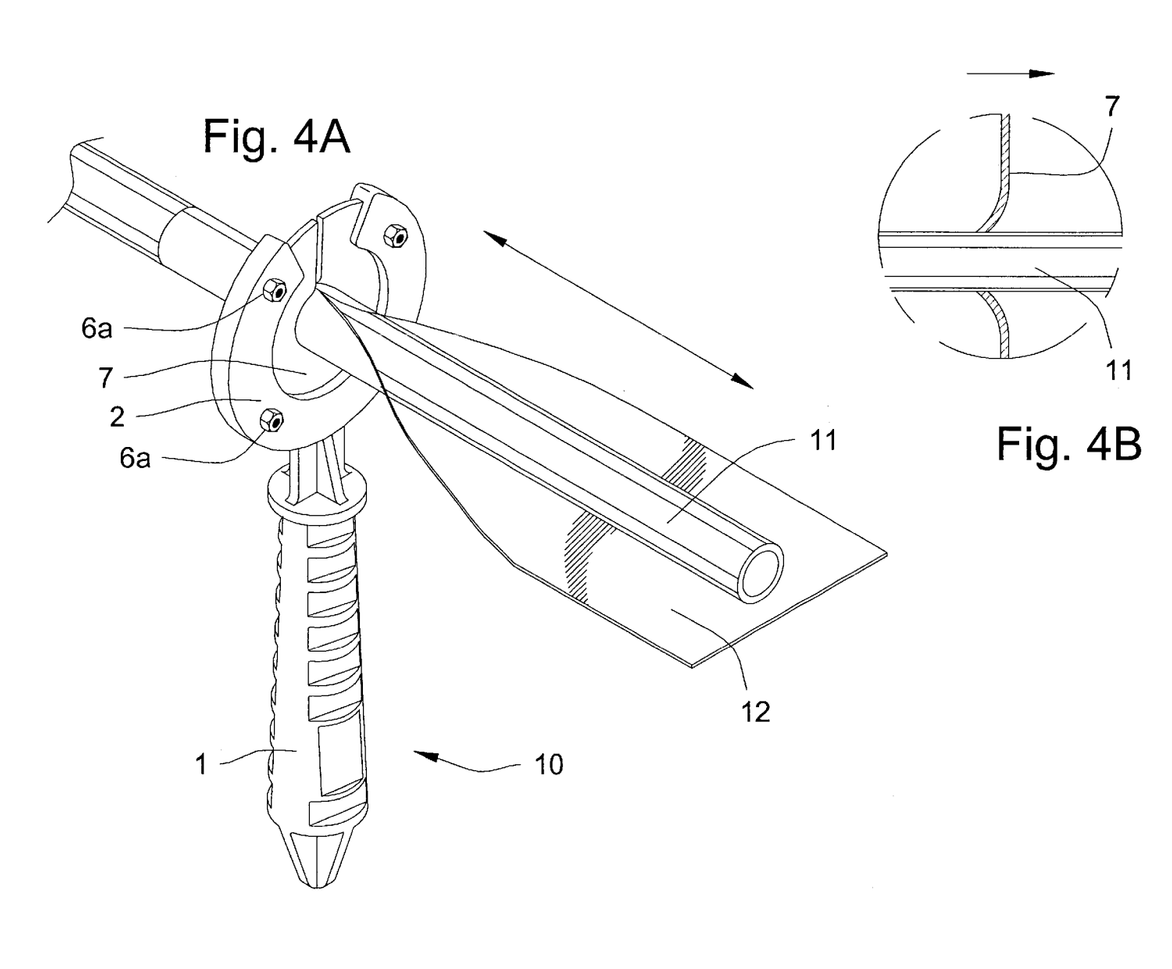
FIGS. 4A and 4B are a perspective view and a detailed view illustrating use of a tool according to the invention.

FIGS. 4A and 4B illustrate in perspective and detailed views one use of the tool according to the invention. In FIGS. 4A and 4B, a shaft 11 of a golf club is having applied to it a double-faced adhesive tape 12. In the illustrated process, the vertical wrap method described previously in being employed. The double-faced tape 12 is initially placed in contact with and generally parallel to a golf club shaft 11. The tool 10 has been previously placed along the golf club shaft with the shaft protruding through the opening 7A in the flexible member 7 or, if the head of the golf club has not yet been attached, the club end of the shaft can be inserted into the central opening 7A after the tape has been applied to the opposite end of the shaft 11. Generally, the golf club shaft is smaller in diameter at the club head than at the butt end and tapers toward the head end.

After the application of the tape 12 in a longitudinal direction of the shaft, the tape is wrapped at the end nearest the club head end and the tool 10 is drawn gradually from that end toward the butt end of the shaft 11, as shown in FIG. 4A. The flexible member 7 engages the tape 12 at the central opening 7A, urging the tape edges together and overlapping those edges on the shaft 11 as the tool is drawn toward the butt end of the shaft and ultimately removed. As seen in a detailed cross-sectional view in FIG. 4B, the edge of the central opening 7A of the flexible member 7 is deflected along the shaft 11, providing a uniform circumferential force urging the tape onto the shaft 11 and smoothly continuing the overlapping of the tape. As the tape 12 has a uniform width and the diameter of the shaft 11 increases toward the butt end, the overlap gradually decreases toward the butt end. The slit 7B in the flexible member 7 permits nearly uniform circumferential deflection of the flexible member 7 and application of a substantially uniform circumferential force as the tool is moved along the shaft to complete the attachment and overlapping of the tape. The slit prevents puckering and buckling of the flexible member, particularly at the largest diameter butt end of the shaft. The larger peripheral openings 7C' and 7C" accommodate larger forces applied to or by the flexible member 7 without puckering or buckling of the flexible member, in part by reducing the part of the flexible member not directly supported by the frame 2.

Figures 5A, 5B, 5C, 5D:
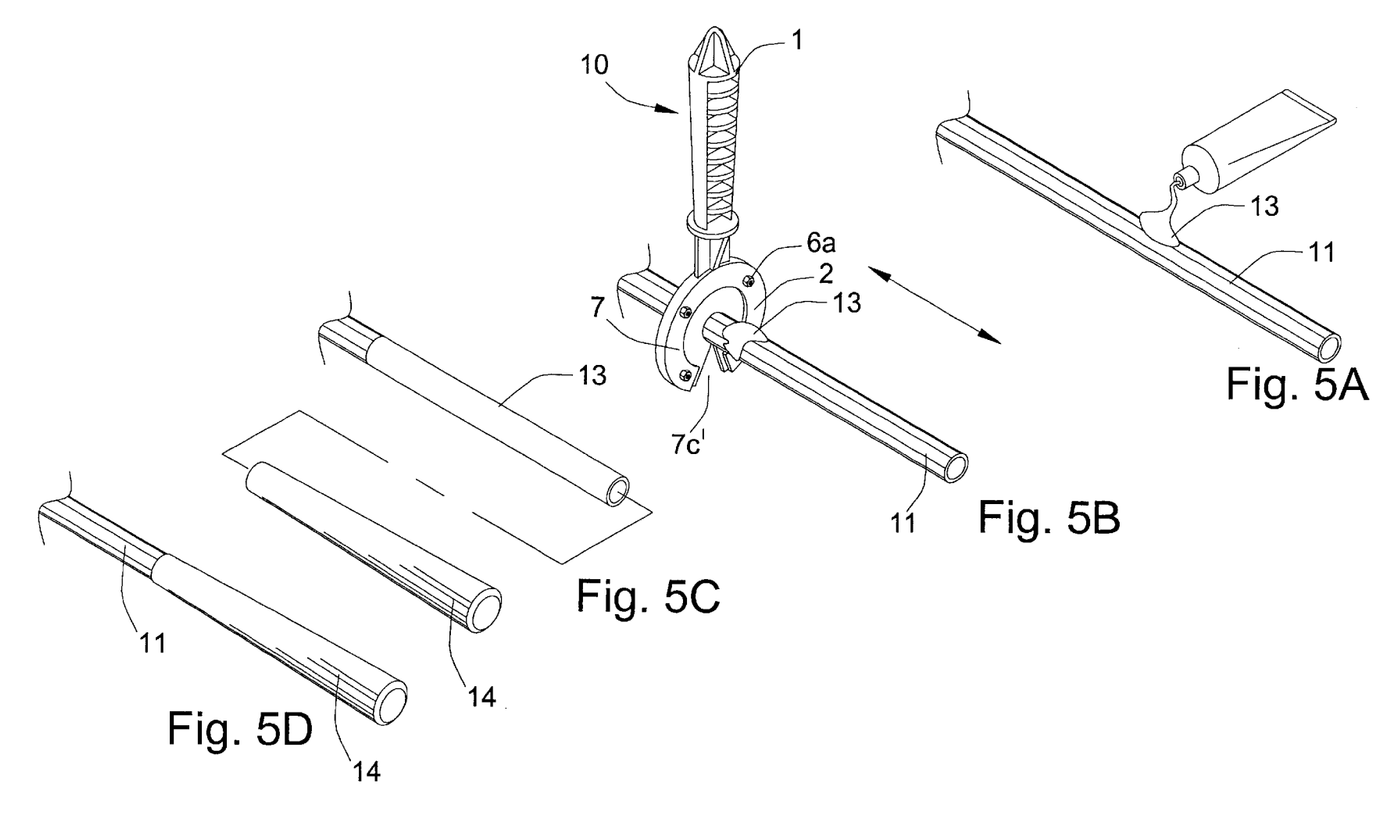
FIGS. 5A, 5B, 5C, and 5D are views illustrating a method of using a tool according to the invention.

FIGS. 5A–5D and 6A–6H illustrate particular processes employing a tool according to the invention. In the process illustrated in FIGS. 5A–5D, initially a liquid or semi-liquid bonding agent 13 is applied to the butt end of a golf club shaft 11, as shown in FIG. 5A. The bonding agent is applied non-uniformly from a tube or other source. As shown in FIG. 5B, the tool 10 is then drawn along the golf club shaft, with the shaft disposed within the central opening 7A of the flexible member 7, toward the butt end of the golf club shaft 11. In this process, the flexible member, at the central opening 7A, is in direct contact with the golf club shaft 11 and, thus, the bonding agent 13 is spread, in a squeegee action, into a substantially uniform coating on the surface of the golf club shaft. As illustrated in FIG. 5B, the embodiment of the tool employed in this step includes the relatively wide peripheral opening 7C' or 7C", illustrated in FIGS. 3A and 3B. This wider opening allows somewhat increased deflection of the flexible member and greater pressure to be applied to the golf club shaft to spread the bonding agent 13 uniformly. Thereafter, as shown in FIG. 5C, the end of the golf club shaft including the film of bonding agent 13 is inserted into the open end of the grip 14, producing the assembly shown in FIG. 5B. Any excess bonding agent is cleaned and the bonding agent is then permitted to cure, completing the assembly.

Figure 6A:
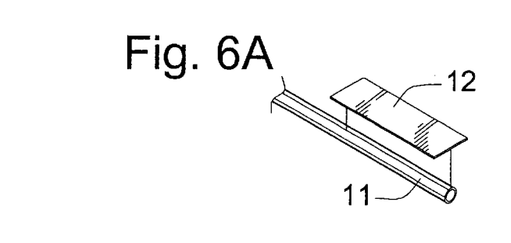
Figure 6B:
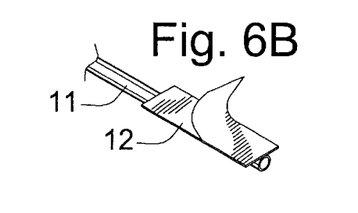

FIGS. 6A–6H illustrate the vertical wrap double-sided tape method, referred to in the description of FIGS. 4A and 4B. As shown in FIG. 6A, the elements employed in this method comprise the golf club shaft 11 and the double-faced tape 12. The exposed sticky side of the tape is applied to the butt end of the golf club shaft 11, as shown in FIG. 6B, preferably with a part of the tape extending beyond the large end, i.e., the butt end, of the shaft. Thereafter, the backing tape covering the second adhesive side of the tape is removed. Then, as shown in FIG. 6C, an activating solvent 15 is poured over the tape 12. This activating solvent makes the tape both slippery and tacky.

Figures 6C, 6F:
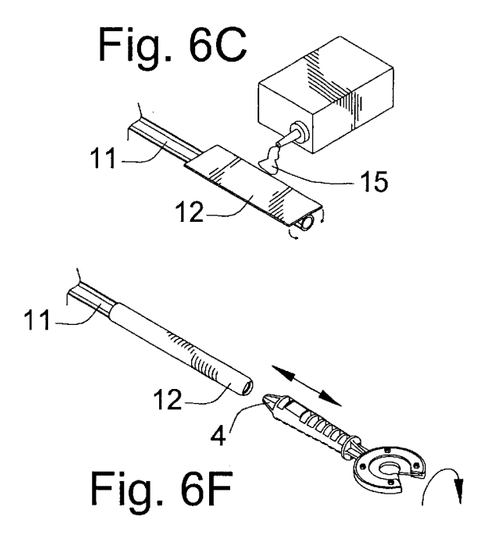
Figure 6D:
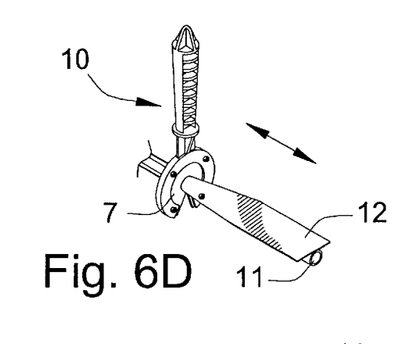
Figure 6E:
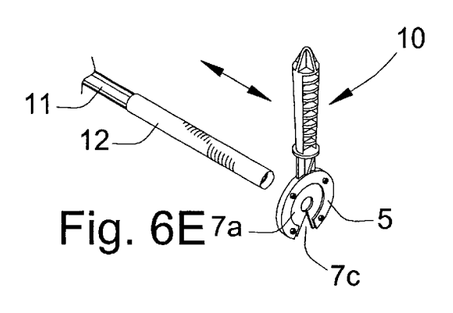
Figure 6G:
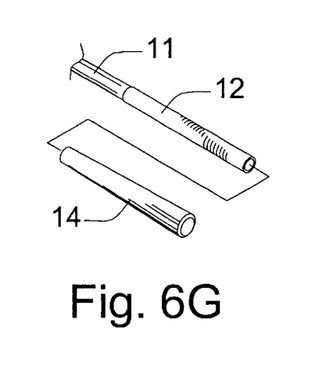
Figure 6H:
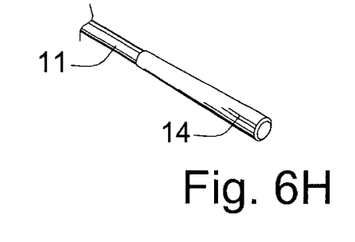

Preferably, the end of the tape nearest the golf club head end of the shaft is urged against the shaft and the tool 10 is then drawn along the shaft toward the butt end. In that process, the shaft is disposed within the central opening 7A of the flexible member 7. The flexible member 7 engages the tape and urges it, in a circumferentially applied force, against the shaft. The edges of the tape 12 are thus neatly overlapped along the entire length of the shaft. As shown in FIG. 6E, after the tool is drawn clear of the shaft, a small part of the tape extends beyond the butt end of the shaft. The free end of the tape is tucked into the opening in the butt end of the shaft using the tapered end 4 of the tool 10, as illustrated in FIG. 6F. As shown in FIG. 6G, the taped end of the golf club shaft 11 is inserted into the grip 14, producing the assembly shown in FIG. 6H. As in the previous process, any excess activating solvent is removed and the assembly is set aside so that the tape and solvent cure to strongly adhere the grip to the shaft.

In all of these processes, the action of the flexible member in deflecting at the central opening 7A is essential to the process. That flexible member needs to be made of a material that is not affected by the adhesive on the tape 12, the bonding agent 13, or the activating solvent 15. Examples of appropriate materials that are not affected by the solvents or adhesives are rubber and other elastomers and tetrafluoroethylene. The flexible member is easily changed to provide a member with an appropriately sized central opening and slit or peripheral opening of a size chosen for use in a particular process. The tool provides a simple means for applying adhesive and/or tape in the course of assembling golf club grips on golf club shafts. The process is reliable and particularly rapid so that the tool is particularly useful in this application.

Of course, the tool described may be used for other purposes and is not defined by nor limited by the described uses. In other words, although the invention has been described with respect to certain preferred embodiments, it is not limited to those embodiments. Various additions and substitutions for the described embodiments will occur to those of skill in the art. Accordingly, the scope of the invention is defined solely by the claims.

What is claimed is:

1. A hand tool comprising:
   a handle;
   a frame extending from the handle, the frame including a central opening and two edges extending from the central opening to a peripheral edge of the frame, defining a peripheral opening in the frame; and
   a clamp with a central opening, fastenable to the frame for clamping a flexible member having a central opening between the frame and the clamp with the central openings of the frame, the flexible member, and the clamp generally aligned.

2. The hand tool of claim 1 including a flexible member for clamping between the clamp and the frame, the flexible member comprising a generally planar member with a central opening and a slit extending from the central opening to an outer edge of the flexible member.

3. The hand tool of claim 1 including a flexible member for clamping between the clamp and the frame, the flexible member comprising a generally planar member with a central opening and two edges, extending from the central opening to an outer edge of the member and defining, between the edges, a peripheral opening in the flexible member.

4. The hand tool of claim 2 wherein the flexible member is an elastomeric material.

5. The hand tool of claim 3 wherein the flexible member is an elastomeric material.

6. The hand tool of claim 1 wherein the frame is generally annular and the edges of the frame extend radially from the central opening to the peripheral edge of the frame and the peripheral opening is a radial opening.

7. The hand tool of claim 1 wherein the frame includes a generally planar portion and a peripheral flange, transverse to the planar portion, the clamp being received within the peripheral flange.

8. The hand tool of claim 7 wherein the frame is generally annular and the edges of the frame extend radially from the central opening to the peripheral edge of the frame and the peripheral opening is a radial opening.

9. The hand tool of claim 2 wherein the frame is generally annular and the edges of the frame extend radially from the central opening to the peripheral edge of the frame and the peripheral opening is a radial opening.

10. The hand tool of claim 9 wherein the frame includes a generally planar portion and a peripheral flange, transverse to the planar portion, the clamp and flexible member being received within the peripheral flange.

11. The hand tool of claim 2 wherein the frame included a generally planar portion and a peripheral flange, transverse to the planar portion, the clamp and flexible member being received within the peripheral flange.

12. The hand tool of claim 3 wherein the frame is generally annular and the edges of the frame extend radially from the central opening to the peripheral edge of the frame and the peripheral opening is a radial opening.

13. The hand tool of claim 12 wherein the frame includes a generally planar portion and a peripheral flange, transverse to the planar portion, the clamp and flexible member being received within the peripheral flange.

14. The hand tool of claim 3 wherein the frame includes a generally planar portion and a peripheral flange, transverse to the planar portion, the clamp and flexible member being received within the peripheral flange.

15. The hand tool of claim 6 wherein the clamp is generally annular and includes two radial edges extending from the central opening to a peripheral edge defining a radial opening for alignment with the radial opening of the frame.

16. The hand tool of claim 1 wherein the handle has a grip portion and a tapered end having a tip smaller than the grip portion.

17. The hand tool of claim 1 wherein the frame includes a generally planar member and a plurality of posts extending transverse to the planar member, the clamp including a plurality of holes for alignment with and receiving the posts for registration of the clamp relative to the frame.

18. The hand tool of claim 17 including a flexible member for clamping between the frame and the clamp wherein the flexible member includes a plurality of holes for alignment with and receiving the posts for registration of the flexible member relative to the frame and clamp.

19. The hand tool of claim 1 wherein each of the frame and the clamp includes a plurality of holes and including a plurality of fasteners extending through the holes and fastening the clamp to the frame.

20. The hand tool of claim 2 wherein each of the frame, the clamp, and the flexible member includes a plurality of holes and including a plurality of fasteners extending through the holes and fastening the clamp to the frame with the flexible member between the clamp and the frame.

21. The hand tool of claim 3 wherein each of the frame, the clamp, and the flexible member includes a plurality of holes and including a plurality of fasteners extending through the holes and fastening the clamp to the frame with the flexible member between the clamp and the frame.

22. The hand tool of claim 2 wherein the central opening of the flexible member has a non-planar surface protruding outwardly within the opening.

23. The hand tool of claim 3 wherein the central opening of the flexible member has a non-planar surface protruding outwardly within the opening.

24. A hand tool comprising:
   a handle;
   a frame extending from the handle, the frame including a central opening and two edges extending from the central opening to a peripheral edge of the frame, defining a peripheral opening in the frame;
   a flexible member comprising a generally planar member with a central opening and a discontinuous portion extending from the central opening to a periphery of the flexible member; and
   a clamp with a central opening, fastened to the frame, clamping the flexible member having a central opening between the frame and the clamp with the central openings of the frame, the flexible member, and the clamp generally aligned.

* * * * *